Patented Aug. 30, 1932

1,874,370

UNITED STATES PATENT OFFICE

FRANCIS M. SIMONDS, OF NEW YORK, N. Y., ASSIGNOR OF ONE-HALF TO A. FILLMORE HYDE, OF NEW YORK, N. Y.

METHOD OF TREATING ORES

No Drawing.     Application filed April 24, 1931.   Serial No. 532,695.

This invention relates to a method of treating various kinds of ores and concentrates containing zinc and provides improvements therein.

The invention provides more especially a process of treatment of zinc ores or complex ores of which zinc sulphide is a constituent, or concentrates thereof, in which the zinc sulphide (or zinc blende) is converted to oxide in the same process and under the same conditions of temperature, as may be used to convert to oxides other sulphides (such as copper, lead and iron sulphides) which may be associated with the zinc blende. The invention has the advantage of economizing in the amount of grinding and heating required in the process of roasting as heretofore practiced, and further provides an economical process of recovering the metals contained in the ores.

In my U. S. Patent No. 1,637,838, I have disclosed a process of treating various ores, of which zinc sulphide may be a constituent. In that process, the zinc blende after passing through the prolonged oxidizing period (and also through the alternate oxidation and reduction, and prolonged reducing period) remained as zinc blende. I have discovered that if zinc blende be ground very fine, it will be converted to oxide and remain as such at the temperatures used for converting the other constituents of the ore to oxides and metallic form. These temperatures are always maintained below the sintering temperature of the ore under the conditions prevailing.

A further feature of the process is that when subjecting the ore to gaseous treatment according to my aforesaid patent, during the prolonged period of oxidation, and also the short periods of oxidation, the temperature may be kept low enough to practically avoid the formation of oxygen compounds of iron with other metals, specially with zinc, which compounds present difficulties in the art of leaching zinc ores as heretofore practiced. If, however, small amounts of these oxygen compounds as, for instance, zinc ferrate, are formed, they will be, during the reducing periods, broken up into metallic iron and oxide of zinc.

According to the invention, at one stage or another of the process, as hereinafter more fully explained, the zinc blende is ground to a very fine powder. When ground to a fineness of 200 mesh, for example, and roasted, as hereinbefore and hereinafter explained, the zinc blende, whether pure, or impure as in the variety called marmatite, will be converted to oxide.

The grinding of the zinc blende to fine powder may be effected in several ways. One way is to grind all of the ore or a concentrate thereof to a very fine powder (200 mesh for example).

Another way is to grind the ore or a concentrate thereof to any coarse mesh, and regrind to 200 mesh the zinc sulphide remaining after the subsequent treatment of the ore. Where it is desired to first concentrate the coarsely ground ore, it is ground to a mesh at which it can be economically concentrated by tables, flotation or otherwise (20 mesh for example). Where it is not necessary or desired to concentrate, good results have been obtained with ore as coarse as 8 mesh. By "economically concentrated" is meant that a large portion of the gangue of the ore can be discarded as clean tailings, the middlings going with the high grade concentrate. After ore or concentrate which is more coarsely ground than 200 mesh is treated in the furnace, it should be ground to sufficient fineness, if not already so, to enable a mechanical separation of the zinc blende from the other constituents of the treated mass to be made. The separation of zinc blende may take place either before or after other substances, zinc oxide and metallic copper for instance, have been extracted from the treated mass, as hereinafter more fully described.

The separation of the zinc blende may be effected by any suitable means, for example flotation. The separated zinc sulphide is ground very fine, 200 mesh or thereabout, and the very fine grinding is preferably only done upon the zinc blende fraction, unless of course it should be necessary to grind to 200 mesh to make the separation.

The ore or concentrate which has undergone furnace treatment is much less costly to grind to a fineness necessary to permit a mechanical separation of the zinc blende from the other ingredients, than the raw ore or concentrate, for the reason that the treated ore is much softer, and for the reason that much less material will have to be ground owing to loss of sulphur, etc., during treatment and further where part of the constituents (zinc oxide, copper, etc.) is removed after furnace treatment.

After fine grinding, the zinc sulphide is roasted, and converted to zinc oxide. The roasting or furnace treatment of the finely ground zinc sulphide is preferably carried out according to my aforesaid Patent No. 1,637,838, by passing a moderately oxidizing gas mixture through the mass. This gas mixture may be obtained by adding air under control to an inert gas, thus diluting the free oxygen and preventing a too rapid local burning of sulphur with its attendant high heat. Sintering under oxidizing conditions may thus be avoided. Under reducing conditions there is little tendency of the ore to sinter even at gas temperatures considerably higher than those used for roasting or oxidizing.

The finely ground zinc blende may be treated separately, but preferably it is added to a mass of raw ore going to the furnace, where it is converted to oxide under the same conditions of temperature which serve for converting the other constituents to be converted. The mass of raw ore containing the finely ground zinc blende is preferably put through the same process of heat treatment and at the same temperatures as described in my aforesaid patent; that is, oxidized, then subjected to alternate reduction and oxidation, and finally to prolonged reduction.

During the prolonged oxidizing period the oxidization is carried on at any suitable temperature above the ignition point of the sulphides and below the sintering point. It is preferred to keep this temperature relatively low, as for example at or below the temperature used in the succeeding alternate oxidation and reduction period. The working temperatures employed in the long oxidation period and in the other periods will depend on the nature of the particular ore to be treated.

During the short periods of alternate oxidation and reduction, the usual temperature found to produce good results ranges from 500° to 650° C., but in special cases a somewhat higher heat may be used. At any of these short reduction periods, particularly the first few, a considerable amount of $SO_2$ is given off as noted in my previous patent. This reaction is largely due to the sulphates of the metals first formed by oxidation of the sulphides being reduced by the reducing gas to sulphites and then broken down to their oxides and $SO_2$. It is to be noted here that sulphites of the metals break down to their respective oxides at a lower temperature than do sulphates and it is this reaction to a large extent which enables this process to produce oxides and especially zinc oxide at a lower temperature than by the ordinary practice of roasting. It is also to be noted that in addition to the sulphates there are other oxygen compounds of the metals which are by alternate reduction and oxidation broken down to oxides at a lower temperature than can be accomplished by roasting with air alone. Arsenates and antimonates of the metals are typical and most common examples of the above mentioned oxygen compounds. During the prolonged period of reduction the temperature may be considerably increased in order to promote more rapidly the reduction of iron and other metal oxides to the metallic state. The usual temperature employed during this period is about 700° C., but here also a higher degree of heat may be used provided the ore is not sintered or objectionable chemical reactions set up.

It is to be noted that the temperatures mentioned are pyrometer readings taken in the stream of hot gas after passing through the ore and about ½ inch from the ore. Often temperatures are taken near the roof of a furnace a considerable distance above the ore where the temperature may be quite different from what would be shown at the surface of the ore itself.

By the procedure described of adding the separated and finely ground zinc blende from ore which has passed through the furnace to new ore passing through the furnace, and so on, the process is made cyclic, and thereby of maximum economy in grinding, heating and handling.

It may be noted here that although it is of course desirable to have the zinc blende fraction clean, that is, as free from other ingredients of the ore as possible, in practice it will be found more economical to allow a small percentage of these other ingredients to pass over with the zinc blende. In other words, the separation should be made so as to have the mass of the ore as free as possible from zinc, for zinc remaining there may be lost, whereas such material as may follow the zinc blende fraction is not lost as it is again returned to the furnace.

After the ore has passed through the furnace as above described it must be treated to separate its various constituents. The method of doing this will vary all the way from having to separate a single substance as, for instance, zinc oxide from its gangue, to having to separate a mixture of zinc oxide together with metallic copper, iron, lead, gold and silver, etc., etc., from each other and from the gangue.

Many combinations of methods may be used depending upon circumstances. The methods outlined in my aforesaid patent may often be advantageously followed.

As metallic iron, metallic copper and zinc oxide can all be dissolved commercially by various solutions, it would appear that wet methods would play a large part in the treatment of the furnace product in order to separate the various metals.

Zinc oxide and metallic copper are conveniently dissolved by ammonia solutions and then separated by filtration from the mass of the treated ore. In this solution containing copper and zinc the copper may be precipitated as metallic copper by the addition of metallic zinc and removed by filtration. The purified zinc solution can then be treated by any well known means to obtain either zinc oxide or metallic zinc, the ammonia in any case being recovered for use over again. The metals remaining in the mass of the ore after the removal of the zinc and copper may then be separated in any suitable manner, the method set forth in my aforesaid patent being advantageously followed.

Concerning the furnace treatment of the ore in three general periods, viz. a relatively long oxidation then alternate short periods of reduction and oxidation followed by a relatively long reduction, I have discovered that on certain ores it may be advantageous to omit entirely the final long reduction period. In this case the ore in the furnace will be subjected only to the first relatively long oxidation and then to the alternate short periods of reduction and oxidation, the last period being oxidation so that the treated ore may be discharged from the furnace in an oxidized condition.

No change in furnace operation as regards temperature or in any other way is made in producing an oxidized finished product from the furnace instead of a metallic product except that the prolonged reduction period is omitted. The alternate short periods of reduction and oxidation faciliates the formation of the oxides at a lower temperature than with air alone as previously mentioned.

The ore in this condition of oxidation lends itself particularly well to attack by solutions in order to separate the various metallic compounds. Many solutions and combinations can be used differing from those used when most of the metals are in the metallic state.

One difference is that when the iron is in an oxidized condition it is but slightly soluble in sulphurous or dilute sulphuric acids. Zinc oxide being soluble in both of these acids, can therefore be dissolved and separated by filtration from the treated mass of oxidized ore. The zinc solutions after purification can be treated in various ways for their zinc content.

The invention may be carried out in other modes of procedure than those herein specifically described.

What is claimed is:

1. In a method of treating ores and concentrates containing zinc sulphide, grinding the zinc sulphide to a fine powder of the order of 200 mesh and converting the sulphide to an oxide, such conversion including passing through same a number of alternations of oxidizing and reducing gases at a temperature below the sintering temperature of the mass.

2. In a method of treating ores and concentrates containing zinc sulphide, grinding the zinc sulphide to a fine powder of the order of 200 mesh and converting the sulphide to an oxide, such conversion including passing through the same a number of alternations of oxidizing and reducing gases at a temperature below the sintering temperature of the mass and generally within the range of 500° to 650° C.

3. In a method of treating ores and concentrates containing zinc sulphide, grinding the ore to a coarse mesh subjecting the ground ore to oxidizing conditions including passing through the same an oxidizing and reducing gas in repeated alternations at a temperature low enough to convert sulphides, associated with the zinc sulphide, to oxides, leaving the zinc sulphide, separating the zinc sulphide, regrinding it to a fine powder, and converting it to oxide, such conversion including passing through the same a number of alternations of oxidizing and reducing gases at a temperature generally within the range of 500° to 650° C.

4. In a method of treating ores and concentrates containing zinc sulphide, grinding the ore to a coarse mesh, subjecting the ground ore to oxidizing conditions including passing through the same an oxidizing and reducing gas in repeated alternations at a temperature low enough to convert sulphides, associated with the zinc sulphide, to oxides, leaving the zinc sulphide; separating the zinc sulphide, regrinding it to a fine powder and adding it to fresh coarse ore undergoing conversion to oxide, said finely ground zinc sulphide undergoing conversion to oxide at the same temperatures at which said other sulphides in the ore are converted.

5. In a method of treating ores and concentrates containing zinc sulphide, grinding the ore to a coarse mesh subjecting the ground ore to oxidizing conditions including passing through the same an oxidizing and reducing gas in repeated alternations at a temperature generally within the range of 500° to 650° C., in order to convert sulphides, associated with the zinc sulphide, to oxides, leaving the zinc sulphide; separating the zinc sulphide, regrinding it to a fine powder and adding it to fresh coarse ore undergoing conversion to oxide, said finely ground zinc sulphide undergoing conversion to oxide at the same temperatures at which said other sulphides in the ore are converted.

In witness whereof I have hereunto signed my name.

FRANCIS M. SIMONDS.